H. V. DAVIS.
Seed-Planter.
No. 68,050.
Patented Aug. 27, 1867.
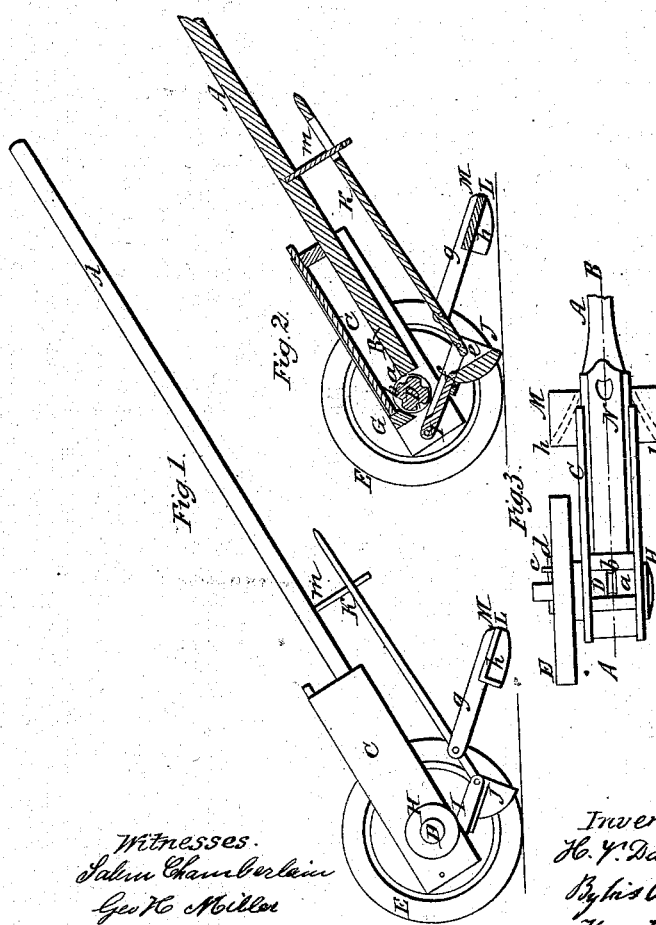

United States Patent Office.

HERMON V. DAVIS, OF AMHERST, ASSIGNOR TO BENJAMIN WHITING, OF HOLLIS, NEW HAMPSHIRE.

Letters Patent No. 68,050, dated August 27, 1867.

IMPROVEMENT IN HAND SEED-PLANTERS.

The Schedule referred to in these Letters Patent and making part of the same.

KNOW ALL MEN BY THESE PRESENTS:

That I, H. V. DAVIS, of Amherst, in the county of Hillsborough, and State of New Hampshire, have invented certain new and useful improvements in Hand Seed-Planters; and I do hereby declare that the following is a full, clear, and exact description of the same, reference being had to the accompanying drawings, forming a part of this specification, in which—

Figure 1 represents a side view of my improved hand seed-planter.
Figure 2 represents a longitudinal central section, and
Figure 3 represents a top or plan view.

To enable those skilled in the art to which my invention belongs to make and use the same, I will proceed to describe it more in detail.

In the drawings the part marked A is the handle by means of which the planter is operated, and the front part B of which forms the bottom of the seed-box C. Just in front of the front end of the handle A is a hole in the seed-box C, through which shaft D of the wheel E passes. Shaft D is grooved out, as shown at $a$, and it is also notched, as shown at $b$. Upon the outer face of wheel E is inserted a staple, $c$, through which pin $d$ passes before it enters the end of axle or shaft D, so that when wheel E is revolved, shaft D will also be revolved. Shaft D is also so arranged that it forms, in connection with the cross-piece G, the front end of box C. H is a head on shaft D, which fits against the side of the seed-box C. Between the front ends of the sides of the seed-box C is hinged one end of the grooved seed-guide I, while to the other end is fastened the opening or furrow-plough J, which has a groove, through which the seeds pass to the ground after they leave the groove $f$ in the seed-guide I. The lower end of adjusting-lever K is hinged between the sides of the seed-guide piece I, while the upper end is supported by a screw-rod, $m$, in the handle A, which passes through a slot in the lever K, and by which the upper end of lever K can be supported at different heights from the ground, to elevate or depress the arms $g\ g$ of the covering device L, which is made with a broad top, M, and two diverging scrapers, $h\ h$. (See dotted lines, fig. 3.) Lever K passes between the arms $g\ g$, which are hinged to the lever, as indicated in the drawings. N is a sliding cover to the seed-box C.

The operation is as follows: A proper supply of seed being placed in the box C, the operator takes hold of handle A, and pushes the machine along before him, and by means of which operation the opening or furrowing-plough J, cuts or opens a furrow in the soil, into which the seed is delivered from box C. As wheel E revolves shaft D is turned, and the seed falling into the recesses $b$, are carried over and dropped down into the groove $f$ in the guide-piece I, from which they slide into and through groove $e$ in the plough J to the furrow or channel formed by the latter, and which is closed or covered up by the scrapers or flanges $h\ h$ upon the under side of the piece M.

It will be observed that the flanges or scrapers $h\ h$ are so made that they gather up and turn the earth in on both sides of the furrow. The shaft D can be made of wood, and consequently very cheap. A new shaft can be used for different kinds of seeds, or for the purpose of dropping the seed at different intervals, or the shaft may be made with a series of removable pieces, which can be taken out and others substituted in lieu thereof; with larger or smaller recesses, $b$, and more or a less number in the shaft. It will also be noticed that by screwing up rod $m$, the covering device is so raised that the flanges or scrapers $h\ h$ do not gather in so much earth. The same result can also be effected by raising the handle A, so that the operator can, if he desires, cover the seed deep or shallow, by simply lowering or elevating the handle A.

My improved hand seed-planter is quite simple in construction, not liable to get out of order, and is easily operated.

Having described my improved hand seed-planter, what I claim therein as new and of my invention, and desire to secure by Letters Patent, is—

1. The combination with wheel E and shaft D of the staple C and pin $d$, substantially as set forth.
2. The combination with the seed-box C and handle A of the grooved guide-piece I, plough J, lever K, and covering device M, $g\ g$, and $h\ h$, substantially as and for the purposes set forth.
3. A hand seed-planter, all the parts of which are constructed and combined together for operation substantially as and for the purposes set forth.

HERMON V. DAVIS.

Witnesses:
SAMUEL BALDWIN,
CHARLES RICHARDSON.